United States Patent
Connelly

(10) Patent No.: US 8,079,058 B2
(45) Date of Patent: *Dec. 13, 2011

(54) BROADCASTING AND PROCESSING MULTIPLE DATA FORMATS

(75) Inventor: Jay H. Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/852,547

(22) Filed: Sep. 10, 2007

(65) Prior Publication Data

US 2008/0005765 A1    Jan. 3, 2008

Related U.S. Application Data

(63) Continuation of application No. 09/412,792, filed on Oct. 5, 1999, now Pat. No. 7,284,261.

(51) Int. Cl.
*H04N 7/16* (2006.01)
(52) U.S. Cl. ........ 725/140; 725/152
(58) Field of Classification Search .......... 725/140, 725/152
See application file for complete search history.

(56) References Cited

U.S. PATENT DOCUMENTS

| 6,684,399 | B1 * | 1/2004 | Grooters ............. 725/48 |
| 7,284,261 | B1 | 10/2007 | Connelly |
| 2003/0066085 | A1 | 4/2003 | Boyer et al. |

* cited by examiner

*Primary Examiner* — James R Sheleheda
(74) *Attorney, Agent, or Firm* — Kacvinsky Daisak, PLLC

(57) ABSTRACT

Various embodiments for broadcasting and processing multiple data formats are described. In one embodiment, a method includes sending scheduling information that identifies an encoding format of a data broadcast and a video viewer application capable of processing the data broadcast. Other embodiments are described and claimed.

25 Claims, 3 Drawing Sheets

BROADCASTING AND PROCESSING MULTIPLE DATA FORMATS

This application is a continuation of U.S. patent application Ser. No. 09/412,792, which was filed on Oct. 5, 1999 and is incorporated by reference.

BACKGROUND

This invention relates to broadcasting and processing data.

Some digital televisions use a viewer application to process data from an audio or video broadcast. The viewer application decodes and presents homogeneous data from different content providers for listening or viewing.

Recently, several new content formats have been developed for data broadcasts. These new contents combine video data and with other content data that enables interactive viewing. New types of software viewer applications process the new content formats.

SUMMARY

In a first aspect, the invention provides a method of broadcasting data. The method includes sending to a receiver scheduling information that includes a scheduled time and broadcasting data at the scheduled time. The scheduling information identifies one or more viewer applications capable of processing the broadcast data.

In a second aspect, the invention provides a method of processing data. The method includes receiving scheduling information that provides broadcast times for data broadcasts and information to identify viewer applications to process the data broadcasts. The method also includes receiving data from one of the broadcasts at the scheduled broadcast time and processing the received data with a viewer application responsive to the scheduling information.

In a third aspect, the invention provides a method of processing data. The method includes receiving scheduling information that provides broadcast times for data broadcasts and information for identifying viewer applications for processing the broadcasts. The method also includes writing the scheduling information to a scheduling table having entries indexed by scheduled broadcast times and channels.

In a fourth aspect, the invention provides a method of processing data. The method includes receiving data from a broadcast at a scheduled broadcast time and selecting a viewer application from a table of available viewer applications to process the data. The method also includes processing the received data with the selected viewer application.

Other features and advantages of the invention will be apparent from the following description and claims.

DETAILED DESCRIPTION

Figure 1:
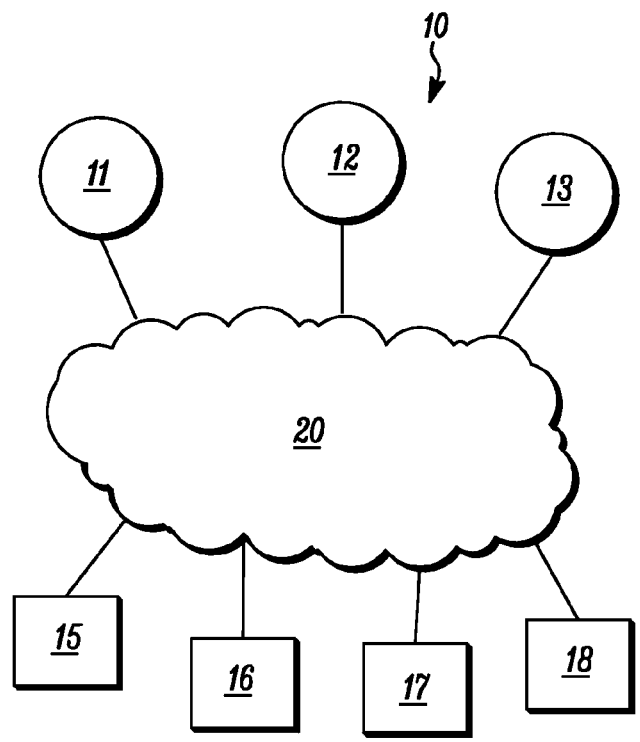
FIG. 1 illustrates a network for broadcasting data in accordance with an embodiment of the invention.

FIG. 1 illustrates a network 10 for broadcasting data from transmitters 11-13 to receivers 15-18. The transmitters 11-13 dynamically change the content format of the data in successive broadcasts. The receivers 15-18 dynamically adjust to process the different content formats differently.

Each receiver 15-18 includes a television with a programmable processor or a personal computer for presenting the broadcasts to viewers. The receivers 15-18 are dynamically reprogrammable to process data from different broadcasts differently.

The transmitters 11-13 broadcast the data through a transport medium 20, such as the Internet, i.e., in multicast group broadcasting, a cable network, a wireless network, a satellite network, and an Advanced Television Systems Committee (ATSC) network. The medium 20 has separate broadcast channels on which different transmitters 11-13 may broadcast. A viewer tunes his receiver 15-18 to one of the channels to receive data from the transmitter 11-13 using that channel.

The transmitters 11-13 broadcast data in a digital coded format. The broadcast data is received and processed by the receivers 15-18. The processing includes decoding the data and presenting the decoded data for audio listening or video viewing. Each receiver 15-18 can process several content formats of broadcast data.

The data of each broadcast belongs to one content format, but the broadcasts can have any format. The content formats may conform to standards and may contain additional features specific to particular content providers. The standards include the MPEG-2 standard by the Motion Pictures Expert Group (MPEG), published in ISO/IEC directives 13818-1 to 13818-3, approved November 1994; the standard proposed in ATVEF comment Draft Specification version 1.1, published by the Advanced TV Enhancement Forum (ATEF) in July 1998; or another standard for coding video or audio data. The features specific to particular providers are enhancements to standard formats, e.g., Disney™ ATVEF format. The enhancements enable individual content providers to exercise control over processing performed by the receivers 15-18 as described below.

Figure 2:
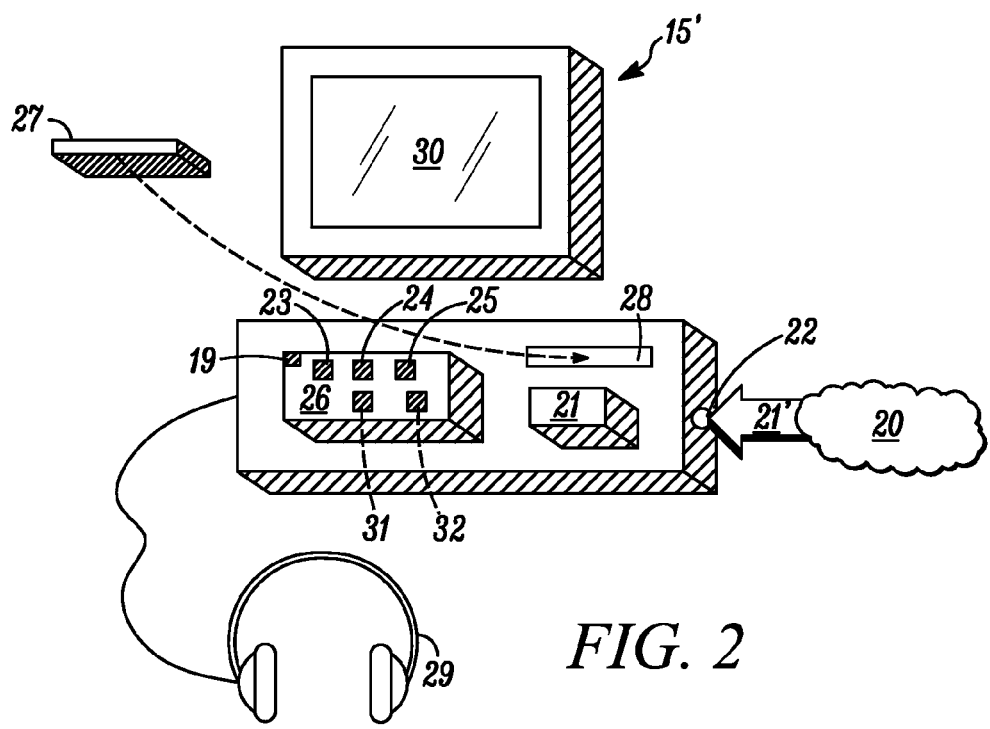
FIG. 2 illustrates a device for viewing data broadcast on the network of FIG. 1 in accordance with an embodiment of the invention.

FIG. 2 shows the receiver 15 of FIG. 1 embodied in a personal computer 15'. The personal computer 15' has a microprocessor 21 that can use several viewer applications 23-25 to process broadcast data received via line 21', which connects to network interface 22. The viewer applications 23-25 are stored in a writable data storage device 26, e.g., a hard disk or random access memory (RAM). The viewer applications 23-25 enable the microprocessor 21 to decode the broadcast data received from the interface 22 and to present the decoded data on listening and visual viewing devices 29, 30.

The microprocessor 21 executes a control application 19 that selects an appropriate viewer application 23-25 to process data from each broadcast. The control application 19 uses a scheduling table 31 and a viewer application selection table 32 to select one of the viewer applications 23-25 for processing data from each broadcast. The scheduling and viewer application selection tables 31, 32 are also stored in the data storage device 26 and can be updated by the microprocessor 21.

A user can make new viewer applications 23-25 available to the microprocessor 21. To add a new viewer application 23-25, the user stores the new application 23-25 to the data storage device 26 and adds an entry for the new application 23-25 in a viewing application selection table 32. Each entry includes a number of parameters for identifying broadcast data that can be processed with the new viewer application 23-25. For example, the parameters may include a broadcast channel, content provider, and/or content format.

A content provider may make new viewer applications available to users, e.g., to support new features of content formats being produced by the provider. The new viewer applications may be distributed on magnetic or optical disks 27 in a form readable by a disk reader 28. The new viewer applications may also be distributed through an Internet site where a user can download the applications or broadcast over a satellite, ATSC, or cable network.

Figures 3, 4:
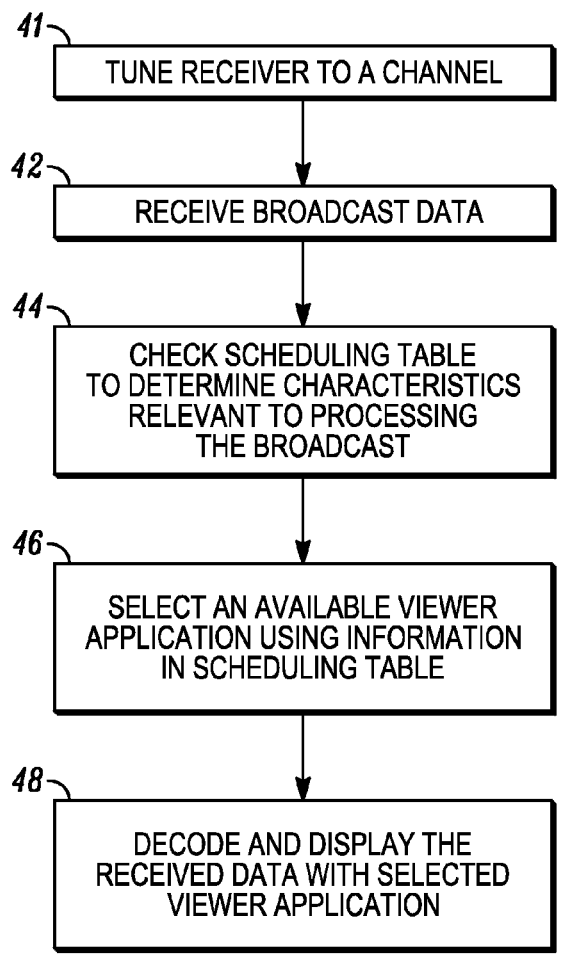
FIG. 3 is a flow chart illustrating a method of processing broadcasted data in accordance with an embodiment of the invention.
FIG. 4 shows a portion of an exemplary scheduling table in accordance with an embodiment of the invention.

FIG. 3 is a flow chart for a method 40 by which a receiver, e.g., a receiver 15-18 of FIGS. 1-2, processes data broadcast by a transmitter, e.g., a transmitter 11-13. To start processing, a user tunes his or her receiver to a channel on which a transmitter broadcasts (step 41). In response to the selection, the receiver receives data broadcast on the selected channel (step 42). In response to receiving data from the selected channel, the receiver looks up schedule information with relevant characteristics for identifying the viewer application 23-25 to process the scheduled data broadcast (step 44). These characteristics may include the content provider and content format as shown in exemplary scheduling table 31. The characteristics may also include information on viewer ages, e.g., to stop children from seeing portions of some broadcasts. The look up includes comparing the actual broadcast time and channel with entries of the scheduling table 31, which are indexed by channel and time. The look up dynamically associates relevant characteristics, e.g. the individual content provider and content format, with each broadcast.

FIG. 4 shows a portion of one embodiment of the scheduling table 31 of FIG. 2. The scheduling table 31 has entries 32-35, which are indexed by broadcast time interval and channel in columns A and B, respectively. The entries 32-35 provide information for identifying one or more viewer applications 23-25 for processing a scheduled broadcast. In the exemplary table 31, the information includes an identity of a content provider and a content format in columns C and D for each broadcast. The content provider is the entity that created the broadcast data. Content providers include organizations, such as ABC™, NBC™, CBS™, and Disney™ that produce products for broadcast by different transmitters. Content providers may also include single transmitters, e.g., one of the transmitters 11-13, which broadcast data in special local formats.

Referring again to FIG. 3, information from the scheduling table 31 enables selections of viewer applications 23-25 adapted to processing the scheduled broadcast data. The receiver selects a viewer application 23-25 by using the information looked up in the scheduling table 31 as an index for finding entries 51-55 in the viewer application selection table 32 (step 46). The entries 51-55 list the viewer applications 23-25 that are presently available to the receiver.

Each entry of the scheduling table 31 identifies one or more entries for viewer applications 23-25 in the viewer application selection table 32. Each identified viewer application 23-25 can process the broadcast data associated with the entry in the scheduling table 31. The receiver 15' selects a best entry from among the identified entries as described below. The receiver 15' decodes and displays the data using the viewer application 23-25 associated with the best entry (step 48).

Figure 5:
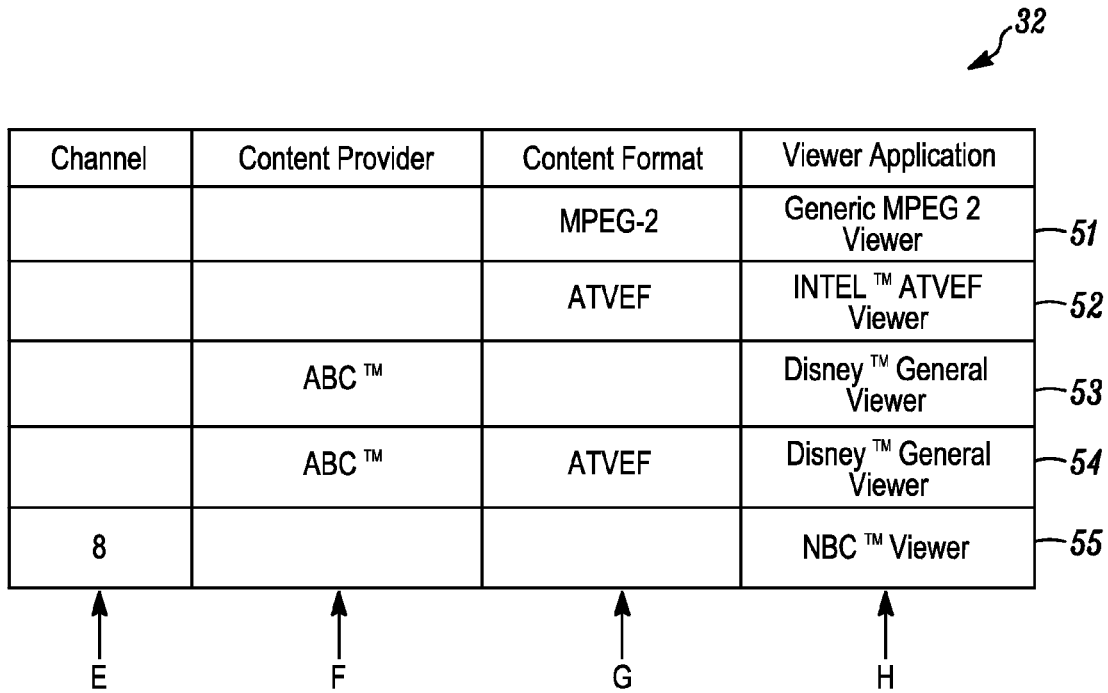
FIG. 5 shows a portion of an exemplary viewer application selection table in accordance with an embodiment of the invention.

FIG. 5 shows a portion of one embodiment of the viewer application selection table 32 of FIG. 2. The viewer application selection table 32 has entries 51-55, which are indexed by information relevant to identifying a viewer application 23-25. Here, the data includes a broadcast channel, a content provider, and a content format in columns E, F, and G, respectively. Each entry 51-55 assigns one viewer application 23-25, in column H, to use to process broadcast data described by the information in columns E, F, and G, i.e., scheduling information.

The viewer application selection table 32 of FIG. 5 is an example of one such table. Other embodiments may employ viewer application selection tables 32 having other types of attribute value pairs in columns E, F, G, H.

Several entries 51-55 of the viewer application selection table may match information from one entry 32-35 of the scheduling table 31. For example, the entry 33 of the scheduling table 31 has broadcast channel 2, provider ABC™, and format ATVEF. These broadcast parameters match index fields of columns E, F, and G, for the entries 52-54 of the viewer application selection table 32. If multiple matches occur, the receiver 15' selects the entry that best matches the scheduling information and uses the viewer application 23-25 associated with that entry to process the broadcast data.

In one embodiment, the best matching entry has more non-blank index columns than other matching entries of the viewer application selection table 32. If no matches occur with all non-blank entries, the receiver 15' looks for a match with entries having one blank field. The search continues to less specific entries if matches are still not found, i.e., two blank fields, etc. In the above example, the entry 54 is the best match, because this entry 54 has two non-blank index columns F, G whereas the entries 52-53 only have one non-blank column each, i.e., columns F or G.

Some receivers assign weights to the columns E-G for use in determining which entry 51-55 is the best match. For example, the weights may be 1, 2, and 3 for columns E, F, and G, respectively. Then, an NBC™ broadcast of ATVEF data on channel 8 matches both entries 52 and 55 in the viewer application selection table 32 shown in FIG. 5. But, the receiver selects the Intel™ ATVEF viewer application from entry 52, because the weight of the column G is higher than that of column E, i.e., the entry 52 is the best match.

The viewer application selection table 32 provides multiple matches, because the receivers 15-18 of FIG. 1 have default applications among the viewer applications 23-25. The default applications can process many content formats. More specific matches provide viewer applications 23-25 that support additional features in broadcast data. For example, content provider ABC™ may incorporate special interactive features into its ATVEF content. Those features are presented to viewer if the receiver 15' processes the ABC™ broadcast data with a Disney™ General Viewer of entry 54, i.e., a specific match. If the receiver 15' does not have the Disney™ general viewer, the receiver 15' processes ABC™ ATVEF broadcasts with the default Intel™ ATVEF viewer, i.e., associated with entry 52. The default viewer may not support the special interactive features incorporated by ABC™.

Figure 6:
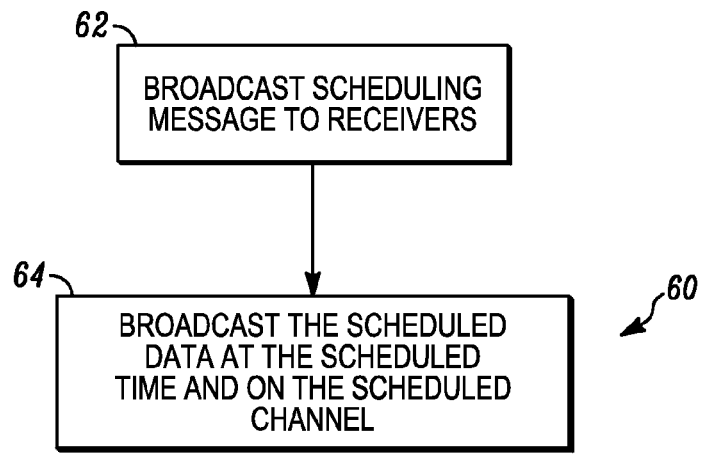
FIG. 6 is a flow chart illustrating a method of broadcasting data in accordance with an embodiment of the invention.

FIG. 6 is a flow chart illustrating a method 60 used by a transmitter, e.g., a transmitter 11-13 of FIG. 1, to broadcast data. The transmitter sends a scheduling message to the receivers, e.g., the receivers 15-18 of FIG. 1 (step 62). The scheduling message provides scheduling information for one or more broadcasts, i.e., one or more entries 33-35 in the scheduling table 31 shown in FIG. 4. The scheduling information may include time interval, channel, content provider, and/or content format.

In response to receiving a scheduling message, a receiver updates its scheduling table, e.g., the table 31 of FIG. 2 for the receiver 15. The receiver writes a new entry to its scheduling table for each new data broadcast announced by a received scheduling message.

In the network 10, the scheduling messages may also be sent over the same medium 20 of FIG. 1 that transports data for viewing or over a separate network. The separate network may be the Internet or a service information channel reserved for sending scheduling messages from the transmitters 11-13 to the receivers 15-18.

The transmitter broadcasts the scheduled data over the channel at the time period announced in the previous scheduling message (step 64). The scheduling messages are sent sufficiently ahead of data broadcasts to ensure that receivers can update their scheduling tables 31 prior to the broadcasts.

Other embodiments are within the scope of the following claims.

What is claimed is:

1. A method comprising:
   providing a new video viewer application associated with a particular television content provider for distribution to a user, wherein the particular television content provider is associated with a particular broadcast channel;
   sending scheduling information that identifies an encoding format of a data broadcast created by the particular television content provider to a receiver, the scheduling information capable of processing by the receiver to select the new video viewer application, the new video viewer application to present the data broadcast created by the particular television content provider as viewable video content which includes additional features incorporated by the particular television content provider;
   processing the scheduling information in the receiver to select one video viewer application stored on the receiver from a plurality of video viewer applications comprising at least:
      a first video viewer application associated with a particular television content provider, the first video viewer application to present data from the particular television content provider as viewable video content which includes additional features incorporated by the particular television content provider,
      a second video viewer application functioning as a default video viewer application, the default video viewer application to present the data from the particular television content provider as viewable video content without the additional feature, and
      the new video viewer application; and
   sending the data broadcast created by the particular television content provider in the encoding format to the receiver over the particular broadcast channel.

2. The method of claim 1, further comprising:
   providing the new video viewer application via at least one of: a computer readable medium, a broadcast, or download over a network.

3. The method of claim 1, further comprising sending the data broadcast at a scheduled time.

4. The method of claim 1, wherein the data broadcast is decoded by the new video viewer application.

5. The method of claim 1, wherein the additional features include interactive features.

6. The method of claim 1, wherein the scheduling information identifies at least one of the television content provider or a channel for the data broadcast.

7. A method comprising:
   receiving a new video viewer application associated with a particular television content provider from the particular television content provider, wherein the particular television content provider is associated with a particular broadcast channel;
   receiving scheduling information that identifies an encoding format of a data broadcast created by the particular television content provider at a receiver;
   processing the scheduling information at the receiver to select the new video viewer application stored on the receiver from a plurality of video viewer applications comprising at least:
      a first video viewer application associated with a particular television content provider, the first video viewer application to present data from the particular television content provider as viewable video content which includes additional features incorporated by the particular television content provider,
      a second video viewer application functioning as a default video viewer application, the default video viewer application to present the data from the particular television content provider as viewable video content without the additional feature, and
      the new video viewer application,
   the new video viewer application to present the data broadcast created by the particular television content provider as viewable video content which includes additional features incorporated by the particular television content provider; and
   receiving the data broadcast created by the particular television content provider in the encoding format at the receiver over the particular broadcast channel.

8. The method of claim 7, further comprising:
   storing the new video viewer application to a storage device; and
   adding an entry for the new video viewer application to a viewing application selection table having entries indexed by scheduled broadcast times and channels, wherein the entry includes at least one parameter to identify broadcast data that can be processed with the new video viewer application.

9. The method of claim 8, wherein the viewing application selection table comprises a plurality of columns containing scheduling information data.

10. The method of claim 9, wherein processing the scheduling information comprises:
    assigning weights to the columns; and
    using the weights to determine which video viewer application to select.

11. The method of claim 9, wherein processing the scheduling information comprises:
    selecting the video viewer application corresponding to an entry in the viewing application selection table having the fewest non-blank columns.

12. The method of claim 7, further comprising processing the data broadcast with the new video viewer application.

13. The method of claim 7, wherein the additional features include interactive features.

14. A data storage device comprising a computer-readable storage medium storing executable computer program instructions that when executed by a computer cause the computer to:
    provide a new video viewer application associated with a particular television content provider for distribution to a user, wherein the particular television content provider is associated with a particular broadcast channel;
    send scheduling information that identifies an encoding format of a data broadcast created by the particular television content provider to a receiver, the scheduling information capable of processing by the receiver to select the new video viewer application stored on the receiver to present the data broadcast created by the particular television content provider as viewable video content which includes additional features incorporated by the particular television content provider;

process the scheduling information in the receiver to select one video viewer application stored on the receiver from a plurality of video viewer applications comprising at least:

a first video viewer application associated with a particular television content provider, the first video viewer application to present data from the particular television content provider as viewable video content which includes additional features incorporated by the particular television content provider, a second video viewer application functioning as a default video viewer application, the default video viewer application to present the data from the particular television content provider as viewable video content without the additional feature, and the new video viewer application; and send the data broadcast created by the particular television content provider in the encoding format to the receiver over the particular broadcast channel.

15. The device of claim 14, further comprising computer program instructions that if executed enable the computer to:
provide the new video viewer application via at least one of: a computer readable medium, a broadcast, or download over a network.

16. The device of claim 14, wherein the additional features include interactive features.

17. The device of claim 14, wherein the scheduling information identifies at least one of the television content provider or a channel for the data broadcast.

18. A system for receiving data broadcasts, comprising:
an interface to receive a new video viewer application associated with a particular television content provider from the particular television content provider, wherein the particular television content provider is associated with a particular broadcast channel;

an interface to receive scheduling information that identifies an encoding format of a data broadcast created by the particular television content provider and to receive the data broadcast created by the particular television content provider in the encoding format over the particular broadcast channel;

a data storage device storing the new video viewer application that decodes data broadcasts to present the data broadcast created by the particular television content provider as viewable video content, which includes additional features incorporated by the particular television content provider, the data storage device to store a plurality of video viewer applications to decode data broadcasts, the plurality of video viewer applications comprising:

a first video viewer application associated with a particular television content provider, the first video viewer application to present data from the particular television content provider as viewable video content which includes additional features incorporated by the particular television content provider, a second video viewer application functioning as a default video viewer application, the default video viewer application to present the data from the particular television content provider as viewable video content without the additional feature, and the new video viewer application; and a processor coupled to the data storage device, the processor to process the scheduling information to select the new video viewer application on the data storage device.

19. The system of claim 18, further comprising:
a viewing application selection table having entries indexed by scheduled broadcast times and channels; and
an executable control application for writing the scheduling information to a scheduling table having entries indexed by scheduled broadcast times and channels and for adding an entry for the new video viewer application, wherein the entry includes at least one parameter to identify broadcast data that can be processed with the new video viewer application.

20. The system of claim 19, wherein the control application selects the video viewer application to decode data based on information from the scheduling table.

21. The system of claim 19, wherein the viewing application selection table comprises a plurality of columns containing scheduling information data.

22. The system of claim 21, wherein the processor processes the scheduling information data by:
assigning weights to the columns; and
using the weights to determine which video viewer application to select.

23. The system of claim 21, wherein the processor processes the scheduling information data by:
selecting the video viewer application corresponding to an entry in the viewing application selection table having the fewest non-blank columns.

24. The system of claim 18, the processor to process the data broadcast received by the interface with the new video viewer application.

25. The system of claim 18, wherein the scheduling information identifies at least one of the television content provider or a channel for the data broadcast.

* * * * *